United States Patent
Kobayashi et al.

(10) Patent No.: US 7,518,431 B2
(45) Date of Patent: Apr. 14, 2009

(54) SEMICONDUCTOR INTEGRATED CIRCUIT FOR PROCESSING AUDIO AND VIDEO SIGNALS

(75) Inventors: Taku Kobayashi, Kyoto (JP); Keiichi Fujii, Kusatsu (JP)

(73) Assignee: Panasonic Corporation, Osaka (JP)

( * ) Notice: Subject to any disclaimer, the term of this patent is extended or adjusted under 35 U.S.C. 154(b) by 422 days.

(21) Appl. No.: 11/232,683

(22) Filed: Sep. 22, 2005

(65) Prior Publication Data

US 2006/0072696 A1  Apr. 6, 2006

(30) Foreign Application Priority Data

Sep. 28, 2004  (JP) .............. 2004-281581

(51) Int. Cl.
*G05F 1/10* (2006.01)
*G05F 3/02* (2006.01)

(52) U.S. Cl. .............. 327/536; 327/534; 327/535; 327/537; 348/500; 348/571

(58) Field of Classification Search .............. 327/530, 327/534–544; 348/500, 571
See application file for complete search history.

(56) References Cited

U.S. PATENT DOCUMENTS

| | | | |
|---|---|---|---|
| 5,408,140 A | 4/1995 | Kawai et al. | |
| 5,650,741 A | 7/1997 | Nakamura et al. | |
| 5,701,096 A | 12/1997 | Higashiho | |
| 6,107,862 A * | 8/2000 | Mukainakano et al. | 327/536 |
| 6,107,863 A | 8/2000 | Iwata | |
| 6,512,413 B2 | 1/2003 | Okutsu et al. | |
| 6,597,158 B2 | 7/2003 | Umeda | |
| 6,970,035 B2 | 11/2005 | Tanimoto | |
| 2001/0011919 A1 | 8/2001 | Tanimoto | |
| 2002/0130700 A1 | 9/2002 | Walimbe et al. | |
| 2002/0167827 A1 | 11/2002 | Umeda et al. | |
| 2003/0034826 A1 * | 2/2003 | Butler | 327/536 |
| 2003/0155950 A1 * | 8/2003 | van der Valk et al. | 327/156 |
| 2004/0062314 A1 * | 4/2004 | Demas et al. | 375/240.28 |
| 2004/0165407 A1 | 8/2004 | Umeda et al. | |
| 2005/0046464 A1 | 3/2005 | Kobayashi et al. | |
| 2006/0044031 A1 | 3/2006 | Cheung et al. | |

FOREIGN PATENT DOCUMENTS

| | | |
|---|---|---|
| JP | 03-230559 | 10/1991 |
| JP | 5029360 | 2/1993 |

(Continued)

*Primary Examiner*—Kenneth B Wells
*Assistant Examiner*—John W Poos
(74) *Attorney, Agent, or Firm*—RatnerPrestia

(57) ABSTRACT

A semiconductor integrated circuit includes a charge pump circuit that repeats charge and discharge of a capacitor based on a clock signal when an ON/OFF control voltage is ON; a first delay circuit that delays the ON/OFF control voltage; a switch that shorts an output of the charge pump circuit and a GND input terminal when the delayed ON/OFF control voltage is OFF and opens when the delayed ON/OFF control voltage is ON; a first circuit block that is driven by a power voltage which is supplied from a power source input terminal and the charge pump circuit; and a second circuit block that is driven by a power voltage which is supplied from the power source input terminal and the GND input terminal. The first and second circuit blocks are mounted on the same semiconductor integrated circuit chip.

5 Claims, 3 Drawing Sheets

FOREIGN PATENT DOCUMENTS

| | | |
|---|---|---|
| JP | 06-150652 | 5/1994 |
| JP | 06-195971 | 7/1994 |
| JP | 07-078472 | 3/1995 |
| JP | 10-285911 | 10/1998 |
| JP | 2002-300769 | 10/2002 |

* cited by examiner

SEMICONDUCTOR INTEGRATED CIRCUIT FOR PROCESSING AUDIO AND VIDEO SIGNALS

BACKGROUND OF THE INVENTION

1. Field of the Invention

The present invention relates to a semiconductor integrated circuit.

2. Related Art

In recent years, a semiconductor integrated circuit has been developed for the use of a video signal or an audio signal and has been in practical use.

The semiconductor integrated circuit for the video signal generally has a charge pump circuit that outputs a voltage by using charge and discharge of the capacitor, a video signal processing circuit block that is applied with the output voltage of the charge pump circuit and a power source voltage to be driven and processes the video signal, and an output terminal that outputs the output voltage of the charge pump circuit to other capacitor.

The semiconductor integrated circuit for the audio signal has an audio signal processing circuit block is applied with the power source voltage and the ground potential to be driven, and processes the audio signal.

Conventionally, the video signal processing circuit block and the audio signal processing circuit block are normally mounted on the separate semiconductor integrated circuits, respectively.

A product having the both functions of the video processing and the audio processing is mounted with a semiconductor integrated circuit for the video signal and one for the audio signal. In this product, if a video signal processing block only is stopped, for example, due to reduction of current consumption, from the state that the video signal processing circuit block and the audio signal processing circuit block are operating simultaneously, the charge pump circuit is turned off. When the charge pump circuit is turned off, its output terminal is made into a High impedance condition. If the output terminal becomes the High impedance condition with the output voltage of the charge pump circuit applied to the output terminal connected to the substrate of the semiconductor integrated circuit for the video signal, it is feared that the semiconductor integrated circuit causes latch-up. In order to prevent the latch-up, the conventional semiconductor integrated circuit short-circuits between the output terminal and a GND potential during off of the charge pump circuit.

In addition, in JP-A-5-29360, a booster to prevent generation of latch-up when a control signal to be input in a charge pump circuit switches from High to Low is disclosed.

According to the above-described conventional general semiconductor integrated circuits, the video signal processing circuit block and the audio signal processing circuit block are mounted on the substrates of the separate semiconductor integrated circuits, respectively. Thus, if the both semiconductor integrated circuits are mounted on the product, there is a problem that the area on which the semiconductor integrated circuit is mounted is very large on the substrate of the set product. Therefore, it is preferable that the video signal processing circuit block and the audio signal processing circuit block are mounted on one substrate. However, in the case of mounting the conventional video signal processing circuit block and audio signal processing circuit block on one substrate, the following problem may occur.

The conventional semiconductor integrated circuit short-circuits between the output terminal and the GND potential in order to prevent latch-up. If the output terminal and the GND potential are short-circuited, the voltage of the output terminal is rapidly changed. As the conventional case, when the video signal processing circuit block and the audio signal processing circuit block are mounted on the separate semiconductor integrated circuits, a parasite capacity is not formed between the semiconductor integrated circuits for the video and audio signal. Therefore, even if the voltage of the output terminal of the semiconductor integrated circuit for the video signal is rapidly changed, variance of the voltage of the output terminal is not transferred to a P-type substrate of the semiconductor integrated circuit for the audio signal. However, in the case of mounting the video signal processing circuit block and the audio signal processing circuit block on one substrate, the variance of the voltage of the output terminal is transferred to the audio signal processing circuit block, thus resulting in a problem such as a transient sound or the like occurs in the audio signal processing circuit block.

In addition, in the case of switching a state that the audio signal processing circuit block operates only into a state that the video signal processing circuit block operates again, that is, in the case of switching the charge pump circuit from off into on to isolate the output terminal of the charge pump circuit from the GND potential, the voltage of the output terminal of the semiconductor integrated circuit for the video signal is varied from the GND potential to the output voltage of the charge pump circuit. The declination of this voltage variance is determined by an ability (hereinafter, referred to as "an output impedance of a charge pump circuit") to discharge the voltage from the charge pump circuit to a capacitor for holding the voltage connected to the output terminal. Mounting the video signal processing circuit block and the audio signal processing circuit block on one substrate, when the declination of the voltage variance is steep, there is also a problem that the operation of the audio signal processing circuit block in the operating state is influenced.

SUMMARY OF THE INVENTION

The present invention is made in order to solve the above-described conventional problems and its object is to provide a semiconductor integrated circuit, having two circuit blocks mounted on the same semiconductor integrated circuit, in which variance of the ON/OFF state of one circuit block needing a charge pump circuit can not act on the operation of other circuit block without the need for the charge pump circuit.

In order to solve the above-described object, the present invention has the following configurations.

A semiconductor integrated circuit according to an aspect of the present invention includes a power source input terminal that inputs a power source voltage; a GND input terminal that inputs a GND potential; a control voltage input terminal that inputs an ON/OFF control voltage; an oscillation circuit that outputs a clock signal; a charge pump circuit that is connected to a capacitor and operates based on the ON/OFF control voltage and the clock signal, the charge pump circuit causing the capacitor to charge or discharge repeatedly based on the clock signal when the ON/OFF control voltage is ON; a first delay circuit that delays the ON/OFF control voltage; a switch that is connected between the charge pump circuit and the GND input terminal and operates based on the ON/OFF control voltage outputted from the first delay circuit, the switch shorting the output terminal of the charge pump circuit and the GND input terminal when the ON/OFF control voltage is OFF, and opening when the ON/OFF control voltage is ON; a first circuit block that is driven by a power voltage which is supplied from the power source input terminal and the output terminal of the charge pump circuit; and a second circuit block that is driven by a power voltage which is supplied from the power source input terminal and the GND input terminal, wherein the first circuit block and the second circuit block are mounted on the same semiconductor integrated circuit chip.

According to this invention, it is possible to realize a semiconductor integrated circuit mounting both the first circuit block needing the charge pump circuit, and the second circuit block without the need for the charge pump circuit on the same substrate. In the present invention, as compared to the conventional semiconductor integrated circuit, it is possible to largely reduce the mounting area of the semiconductor integrated circuit on the substrate of the set product.

According to the present invention, it is possible to prevent the variance of the output voltage of the charge pump circuit from acting on the second circuit block in the operating state when the charge pump circuit switches from ON into OFF.

According to the above-described semiconductor integrated circuit, it is preferable that the first delay circuit is mounted on the same semiconductor integrated circuit chip on which the first circuit block and the second circuit block are mounted. In addition, in the above-described semiconductor integrated circuit, the first circuit block may process a video signal and the second circuit block may process an audio signal.

The above-described semiconductor integrated circuit may further include a second delay circuit that delays the ON/OFF control voltage, and the charge pump circuit may control output impedance based on the ON/OFF control voltage outputted by the second delay circuit. It is preferable that the second delay circuit is mounted on the same semiconductor integrated circuit chip on which the first circuit block and the second circuit block are mounted.

According to the present invention, it is possible to prevent the variance of the output voltage of the charge pump circuit from acting on the second circuit block in the operating state when the charge pump circuit switches from OFF into ON.

The present invention has an advantage to realize that a semiconductor integrated circuit mounts two circuit blocks which is a circuit block needing the charge pump circuit and a circuit block without the need for the charge pump circuit, on one substrate.

The present invention has an advantage to realize that a semiconductor integrated circuit mounts two circuit blocks on the same substrate of the semiconductor integrated circuit in which the variance of the ON/OFF state of one circuit block needing the charge pump circuit can not act on the operation of the other circuit block without the need for the charge pump circuit.

DETAILED DESCRIPTION OF THE PREFERRED EMBODIMENTS

The present invention will be specifically described below with reference to the drawings indicating the embodiments.

First Embodiment

Figure 1:
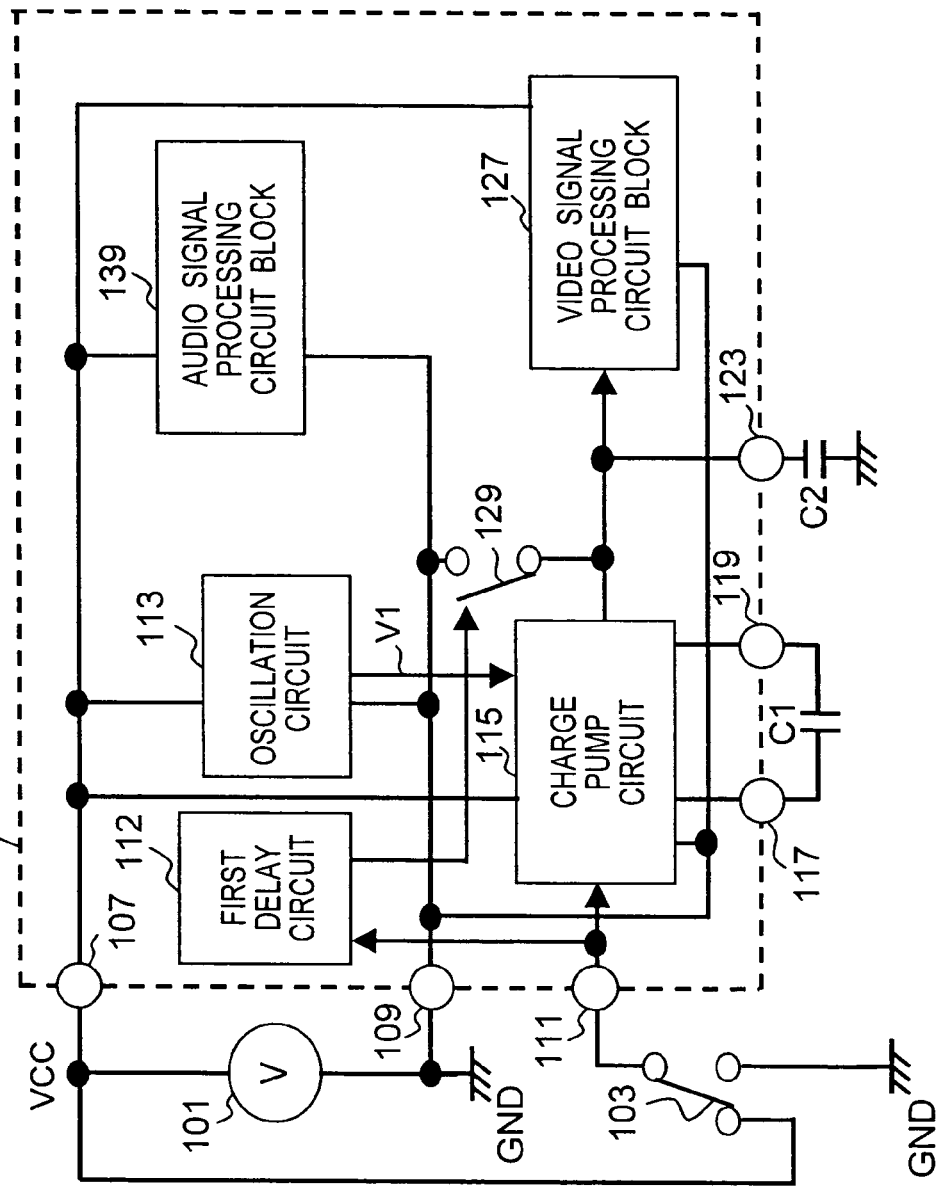
FIG. 1 is a block diagram of a semiconductor integrated circuit according to a first embodiment of the present invention.
Figure 2:
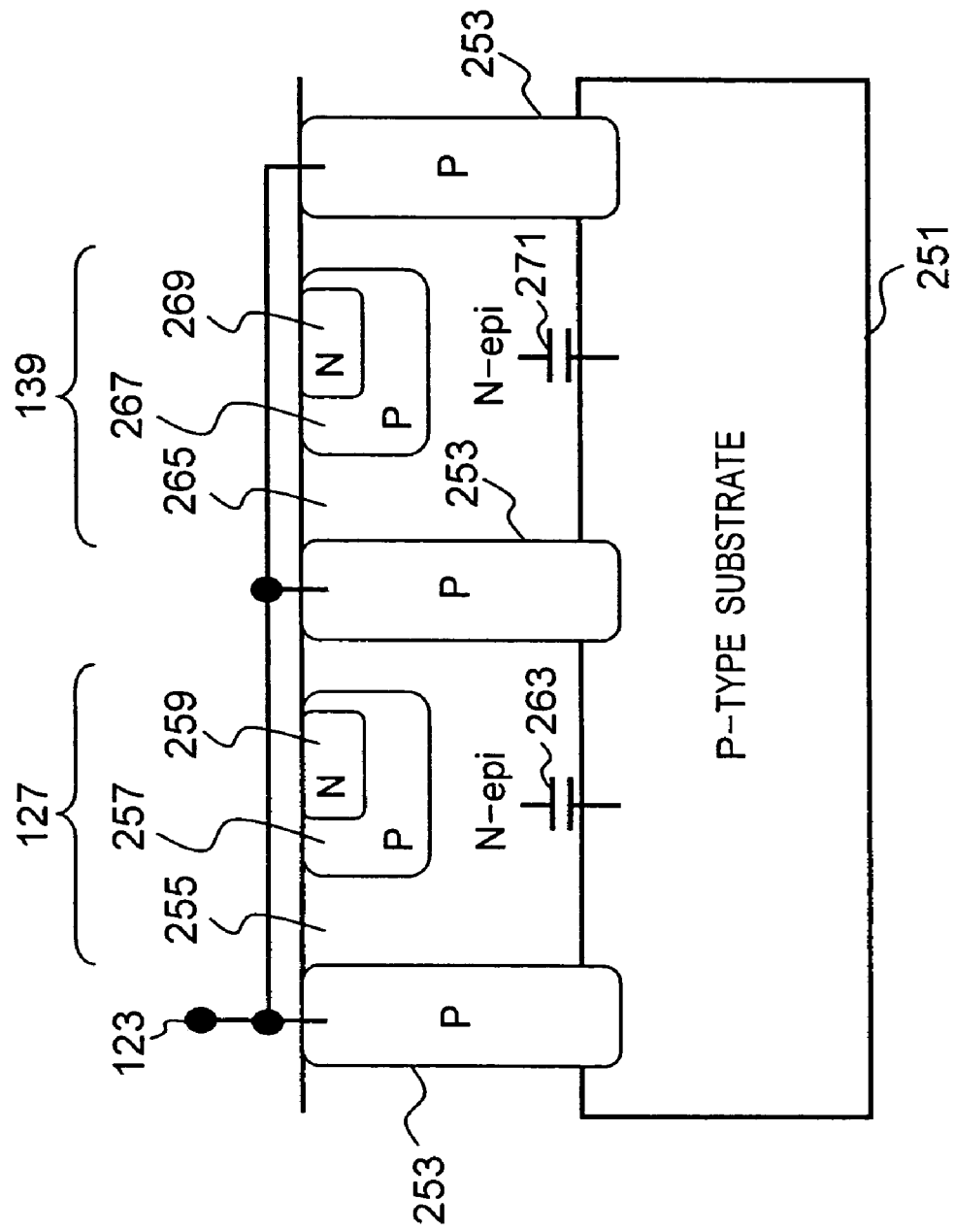
FIG. 2 is a structural view of an NPN transistor typically used in a video signal processing circuit block 127 and an audio signal processing circuit block 139 that are incorporated in the semiconductor integrated circuits according to the first and second embodiments of the present invention.

The semiconductor integrated circuit according to the first embodiment of the present invention will be descried with reference to FIG. 1 and FIG. 2. FIG. 1 illustrates the configuration of the semiconductor integrated circuit according to the first embodiment of the present invention. In FIG. 1, a semiconductor integrated circuit (hereinafter, referred to as an "IC") 105 has a power source input terminal 107 that is connected to a power source 101 and inputs a power source voltage VCC; a GND input terminal 109 that inputs a ground potential (hereinafter, referred to as "a GND potential"); a control voltage input terminal 111 that inputs the power source voltage VCC or the GND potential via a switch 103 as a ON/OFF control voltage of a charge pump circuit; a capacity connection terminal 117 that is connected to one end of a capacitor C1; a capacity connection terminal 119 that is connected to the other end of the capacitor C1; and an output terminal 123 that is connected to a capacitor C2.

The IC 105 further has a first delay circuit 112 that delays the ON/OFF control voltage inputted via the control voltage input terminal 111; a charge pump circuit 115 that outputs a voltage by discharging and charging the capacitor C1; an oscillation circuit 113 that outputs an operation clock of the charge pump circuit 115; a video signal processing circuit block (a first circuit block) 127 that is driven by the output voltage of the charge pump circuit 115 and the power source voltage VCC; a switch 129 that connects or disconnects the output terminal 123 and the GND input terminal 109; and an audio signal processing circuit block (a second circuit block) 139 that is driven by the power source voltage VCC and the GND voltage.

The operation of each element of the IC 105 will be described below.

When the power source voltage VCC is applied to the power source input terminal 107 and the GND potential is applied to the GND input terminal 109, the oscillation circuit 113 starts oscillation to output a clock signal V1.

The switch 103 is connected to the power source voltage VCC or the GND potential, and the control voltage input terminal 111 is applied with the power source voltage VCC or the GND potential via the switch 103. The voltage applied to the control voltage input terminal 111 is supplied to the charge pump circuit 115 as the ON/OFF control voltage of the charge pump circuit 115.

When the power source voltage VCC is applied to the control voltage input terminal 111, the charge pump circuit 115 is turned ON. When the GND potential is applied to the control voltage input terminal 111, the charge pump circuit 115 is turned OFF.

In the ON state, the charge pump circuit 115 causes the capacitor C1 to charge or discharge repeatedly based on the clock signal V1.

When the charge pump circuit 115 charges the capacitor C1, one capacity connection terminal 117 connected to the capacitor C1 is connected to the power source voltage VCC while the other capacity connection terminal 119 is connected to the GND potential. Thereby, the charge pump circuit 115 charges a voltage difference (VCC−GND) to the capacitor C1.

When the charge pump circuit 115 discharges the capacitor C1, one capacity connection terminal 117 is connected to the GND potential while the other capacity connection terminal 119 is connected to the output terminal 123. Thereby, the charged voltage difference (VCC−GND) is discharged from the output terminal 123 as the voltage (−VCC). The voltage (−VCC) discharged from the output terminal 123 is held by the capacitor C2 that is connected between the output terminal 123 and the GND potential.

In the OFF state, the charge pump circuit 115 performs neither of charge nor discharge of the capacitor C1.

The first delay circuit 112 delays the ON/OFF control voltage applied to the control voltage input terminal 111 by a predetermined time and then, outputs it.

The switch 129 opens and closes based on the output voltage of the first delay circuit 112. The switch 129 opens when the charge pump circuit 115 is in the ON state, and closes when the charge pump circuit 115 is in the OFF state. In other words, the switch 129 is in the OFF state when the power source voltage VCC is applied to the control voltage input terminal 111, and in the ON state when the GND potential is applied to the control voltage input terminal 111. When the charge pump circuit 115 is in the OFF state, the output terminal 123 may become High impedance. However, if the output terminal 123 becomes the High impedance state with the output voltage of the charge pump circuit applied to the output terminal 123 connected to the substrate of the IC 105, it is feared that the IC causes latch-up. In order to prevent this, the switch 129 closes to cause short-circuit between the output terminal 123 and the GND input terminal 109.

The video signal processing circuit block 127 starts predetermined operation to process the video signal when the power source voltage VCC is supplied from the power source input terminal 107 and the voltage (−VCC) is supplied from the charge pump circuit 115, as a power voltage of the circuit block.

The audio signal processing circuit block 139 starts predetermined operation to process the audio signal when the power source voltage VCC is supplied from the power source input terminal 107 and the GND potential is supplied from the GND input terminal 109, as a power voltage of the circuit block.

Subsequently, the configurations of the video signal processing circuit block 127 and the audio signal processing circuit block 139 will be described below with reference to FIG. 2. FIG. 2 illustrates a structural view of an NPN transistor typically used in the video signal processing circuit block 127 and the audio signal processing circuit block 139 that are incorporated in the semiconductor integrated circuits according to the first embodiment of the present invention.

In the IC 105, the video signal processing circuit block 127 and the audio signal processing circuit block 139 are mounted on one P-type substrate 251. The video signal processing circuit block 127 has an NPN transistor that is formed by a collector diffused layer 255, a base diffused layer 257, and an emitter diffused layer 259. The audio signal processing circuit block 139 has an NPN transistor that is formed by a collector diffused layer 265, a base diffused layer 267, and an emitter diffused layer 269.

On the P-type substrate 251, a P-type diffused layer 253 to separate the elements configured on the IC 105 is formed. This P-type diffused layer 253 separates the collector diffused layer 255 of the video signal processing circuit block 127 from the collector diffused layer 265 of the audio signal processing circuit block 139. The output terminal 123 is connected to the P-type diffused layer 253 and the voltage applied to the output terminal 123 is applied to the P-type diffused layer 253 and the P-type substrate 251.

Between the P-type substrate 251 and the collector diffused layers 255, 265, parasite capacities 263 and 271 appear. During driving of the IC 105, in order to prevent the operations of these parasite capacities 263 and 271, the potential of the P-type substrate 251 is held at the lowest voltage (−VCC) during operation of the IC 105 by the output terminal 123.

Then, with reference to FIG. 1 and FIG. 2, the case of stopping the operation of the video signal processing circuit block 127 and the case of activating the video signal processing circuit block 127 after that will be described below.

When the video signal processing circuit block 127 and the audio signal processing circuit block 139 are operating simultaneously, if only the video signal processing circuit block 127 is stopped in order to reduce the current consumption or the like, then the switch 103 is connected to the GND potential.

The IC 105 inputs the GND potential from the control voltage input terminal 111. Then, the charge pump circuit 115 incorporated in the IC 105 shifts from the ON state to the OFF state to stop the operation of repeating charge and discharge of the capacitor C1. Thereby, the output terminal 123 stops discharge of the voltage (−VCC) to become High impedance.

The semiconductor integrated circuit according to the first embodiment of the present invention incorporates the first delay circuit 112 to delay the ON/OFF control voltage of the charge pump circuit 115. Thus, from a time when the GND potential is input in the control voltage input terminal 111 till a time set by the first delay circuit 112 has passed, the switch 129 remains OFF. While the switch 129 is OFF, the voltage (−VCC) held by the capacitor C2 connected between the output terminal 123 and the GND potential is gradually discharged by the idling current of the video signal processing circuit block 127 closing to the GND potential. Therefore, the semiconductor integrated circuit according to the first embodiment of the present invention can make the voltage variance when the switch 129 turns ON after the time set by the first delay circuit 112 very small so that it does not generate a defect such as a transient sound or the like.

In this case, if the switch 129 turns ON at the same time when the GND potential is inputted from the control voltage input terminal 111 to connect the output terminal 123 with the GND terminal of Low impedance, the voltage of the output terminal 123 is rapidly changed from (−VCC) to GND. Then, the voltage of the P-type substrate 151 of the IC 105 is also rapidly changed from (−VCC) to GND. The variance of the voltage of the output terminal 123 is transmitted to the NPN transistor of the audio signal processing circuit block 139 in the operating state via the parasite capacity 271. As a result, the audio signal processing circuit block 139 generates a defect such as a transient sound or the like.

When simultaneously operating the video signal processing circuit block 127 and the audio signal processing circuit block 139 again from the case that the audio signal processing circuit block 139 only is operating, the switch 103 is connected to the voltage VCC. The IC 105 inputs the voltage VCC from the control voltage input terminal 111. Then, the charge pump circuit 115 incorporated in the IC 105 shifts from the OFF state to the ON state.

The switch 129 that connects the output terminal 123 to the GND potential of Low impedance when the charge pump circuit is OFF turns off after the time set by the first delay circuit 112 pass. The voltage of the output terminal 123 connected to the P-type substrate 251 of the IC 105 changes from GND to (−VCC). Since this declination of the voltage change is determined by the output impedance of the charge pump circuit 115 and the value of the capacitor C2, it is possible to set this declination so as to prevent generation of the defect such as the transient sound due to the rapid voltage change.

As described above, according to the present embodiment, even if the video signal processing circuit block 127 and the audio signal processing circuit block 139 are mounted on the same substrate, it is possible to prevent variance of the ON/OFF state of one circuit block needing the charge pump circuit 115 from acting on the operation of other circuit block without the need for the charge pump circuit 115.

Second Embodiment

Figure 3:
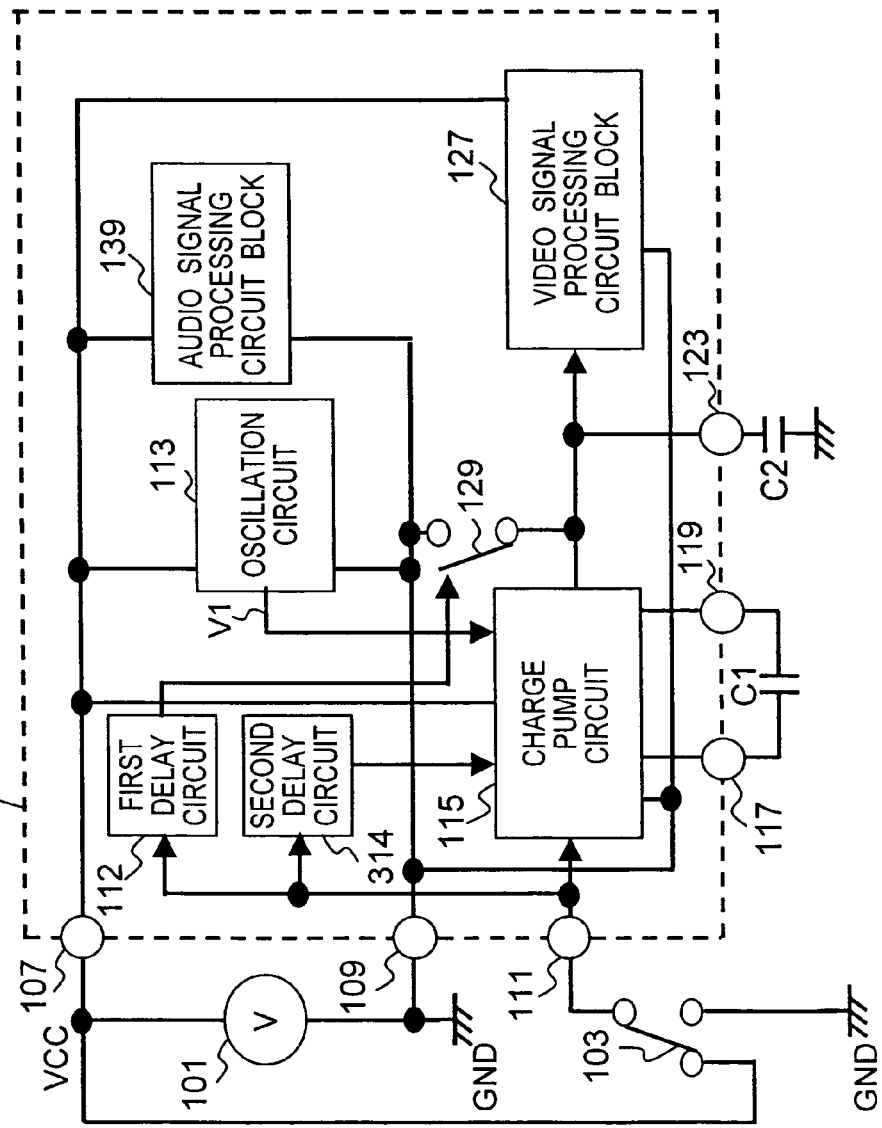
FIG. 3 is a block diagram of a semiconductor integrated circuit according to a second embodiment of the present invention.

Other configuration example of the semiconductor integrated circuit will be described below with reference to FIG. 3. FIG. 3 illustrates a block diagram of a semiconductor integrated circuit according to a second embodiment of the present invention. The semiconductor integrated circuit (IC) 305 according to the present embodiment further has a second delay circuit 314 to delay the ON/OFF control voltage of the charge pump circuit 115. The charge pump circuit 115 controls the output impedance based on the output signal from the second delay circuit 314. In the semiconductor integrated circuit according to the second embodiment, the configurations other than the above are the same as those of the first embodiment. In FIG. 3, the same structural elements as FIG. 1 are given the same reference numerals and the explanation with reference to FIG. 1 is also applied.

The IC 305 according to the second embodiment controls the output impedance of the charge pump circuit 115 when simultaneously operating the video signal processing circuit block 127 and the audio signal processing circuit block 139 again from the case that the audio signal processing circuit block 139 only is operating. This is different from the IC 105 of the first embodiment.

The operation of each circuit when simultaneously operating the video signal processing circuit block 127 and the audio signal processing circuit block 139 again from the case that the audio signal processing circuit block 139 only is operating will be described below.

In the case of operating the video signal processing circuit block 127, in order to shift the charge pump circuit 115 incorporated in the IC 305 from OFF state into ON state, the switch 103 is connected to the power source voltage VCC side. In the IC 305, the power source voltage VCC is input from the control voltage input terminal 111. Then, the switch 129 connecting the output terminal 123 with the GND input terminal 109 of Low impedance turns off after the time set by the first delay circuit 112 passes. The voltage of the output terminal 123 connected to the P-type substrate 251 of the IC 305 changes from the GND to (−VCC). This declination of the voltage variance is determined by the output impedance of the charge pump circuit 115 and the value of the capacitor C2.

In the semiconductor integrated circuit of the present embodiment, since the power source voltage VCC is input in the control voltage input terminal 111 till the time set by the second delay circuit 314 has passed, the output impedance of the charge pump circuit 115 is maintained large even if the charge pump circuit 115 starts the operation. Thus, by making a capacity to discharge the voltage (−VCC) to the capacitor C2 for holding the voltage small, the second semiconductor integrated circuit according to the second embodiment makes the declination of the voltage variance from the GND to (−VCC) gentle so as to prevent generation of the defect such as the transient sound due to the audio signal processing circuit block 139.

In the semiconductor integrated circuit 305 of the second embodiment, the operation when stopping only the video signal processing circuit block 127 from the state that the video signal processing circuit block 127 and the audio signal processing circuit block 139 are operating simultaneously is the same as that of the first embodiment.

Furthermore, according to the first and second embodiments of the present invention, the video signal processing circuit block 127 is applied with the output voltage from the charge pump circuit 115, however, in place of this, the audio signal processing circuit block 139 may be applied with the output voltage from the charge pump circuit 115. In this case, it is possible to realize a semiconductor integrated circuit, whereby the video signal processing circuit block 127 in the operating condition is not influenced even if the charge pump circuit turns ON/OFF for switching ON/OFF of the audio signal processing circuit block 139.

According to the first and second embodiments of the present invention, as the circuit block of the semiconductor integrated circuit, the video signal processing circuit block 127 and the audio signal processing circuit block 139 are used. However, the present invention is not limited to these. For example, the present invention can be applied to the combination of a circuit block driven by supplying the power voltage due to the power source voltage and the output voltage from the charge pump circuit and a circuit block driven by supplying the power voltage due to the power source voltage and the GND potential.

The present invention is available for a semiconductor integrated circuit having the circuit block needing the output of the charge pump circuit and the circuit block without the need for the output of the charge pump circuit.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2004-281581, filed on Sep. 28, 2004, which is expressly incorporated herein by reference in its entirety.

What is claimed is:

1. A semiconductor integrated circuit comprising:
a power source input terminal that inputs a power source voltage;
a GND input terminal that inputs a GND potential;
a control voltage input terminal that inputs an ON/OFF control voltage;
an oscillation circuit that outputs a clock signal;
a charge pump circuit that is connected to a capacitor and operates based on the ON/OFF control voltage and the clock signal, the charge pump circuit causing the capacitor to charge or discharge repeatedly based on the clock signal when the ON/OFF control voltage is ON;
a first delay circuit that delays the ON/OFF control voltage;
a switch that is connected between the charge pump circuit and the GND input terminal and operates based on the ON/OFF control voltage outputted from the first delay circuit, the switch shorting the output terminal of the charge pump circuit and the GND input terminal when the ON/OFF control voltage is OFF, and opening when the ON/OFF control voltage is ON;

a first circuit block that is driven by a power voltage which is supplied from the power source input terminal and the output terminal of the charge pump circuit; and a second circuit block that is driven by a power voltage which is supplied from the power source input terminal and the GND input terminal;

wherein the first circuit block and the second circuit block are mounted on the same semiconductor integrated circuit chip.

2. The semiconductor integrated circuit according to claim 1, wherein the first delay circuit is mounted on the same semiconductor integrated circuit chip on which the first circuit block and the second circuit block are mounted.

3. The semiconductor integrated circuit according to claim 1, wherein the first circuit block processes a video signal and the second circuit block processes an audio signal.

4. The semiconductor integrated circuit according to claim 1, further comprising a second delay circuit that delays the ON/OFF control voltage, wherein the charge pump circuit controls output impedance based on the ON/OFF control voltage output from the second delay circuit.

5. The semiconductor integrated circuit according to claim 4, wherein the second delay circuit is mounted on the same semiconductor integrated circuit chip on which the first circuit block and the second circuit block are mounted.

* * * * *